(12) United States Patent
Douxchamps et al.

(10) Patent No.: US 8,904,824 B2
(45) Date of Patent: Dec. 9, 2014

(54) GLASS MELTING FURNACE

(75) Inventors: Olivier Douxchamps, Jumet (BE); Johan Behen, Jumet (BE)

(73) Assignee: AGC Glass Europe, Bruxelles (BE)

( * ) Notice: Subject to any disclaimer, the term of this patent is extended or adjusted under 35 U.S.C. 154(b) by 331 days.

(21) Appl. No.: 12/934,561

(22) PCT Filed: Mar. 25, 2009

(86) PCT No.: PCT/EP2009/053522
§ 371 (c)(1), (2), (4) Date: Sep. 24, 2010

(87) PCT Pub. No.: WO2009/118340
PCT Pub. Date: Oct. 1, 2009

(65) Prior Publication Data
US 2011/0016923 A1 Jan. 27, 2011

(30) Foreign Application Priority Data
Mar. 25, 2008 (EP) .................................... 08102883

(51) Int. Cl.
*C03B 5/235* (2006.01)
*C03B 5/04* (2006.01)

(52) U.S. Cl.
CPC ................ *C03B 5/04* (2013.01); *C03B 5/2353* (2013.01)
USPC ....... 65/134.6; 35/134.9; 35/135.9; 35/136.3; 35/157; 35/29.13

(58) Field of Classification Search
CPC .......... C03B 5/03; C03B 5/0332; C03B 5/04; C03B 5/16; C03B 5/183; C03B 5/235; C03B 5/2353; C03B 5/237
USPC ........................ 65/335–345, 347, 29.13, 157, 65/134.9–135.2
See application file for complete search history.

(56) References Cited

U.S. PATENT DOCUMENTS

| 801,035 A | * | 10/1905 | Murdock | 340/396.1 |
| 3,728,094 A | * | 4/1973 | Bowman | 5/27 |
| 4,248,615 A | * | 2/1981 | Seng et al. | 65/27 |

(Continued)

FOREIGN PATENT DOCUMENTS

| EP | 0 650 934 | 5/1995 |
| EP | 0 801 035 | 10/1997 |

OTHER PUBLICATIONS

U.S. Appl. No. 12/996,487, filed Dec. 6, 2010, Behen, et al.

(Continued)

*Primary Examiner* — Jodi C Franklin
(74) *Attorney, Agent, or Firm* — Oblon, Spivak, McClelland, Maier & Neustadt, L.L.P.

(57) ABSTRACT

The present invention relates to a glass melting furnace comprising a channel-shaped melting tank, the batch materials being introduced at an upstream end, the molten glass being recovered at the downstream end, said furnace being heated by means of burners, in which the combustion energy is produced by oxy-fuel combustion in respect of at least 65% thereof, the burners being distributed on the walls along the length of the furnace, in which flue gas discharge is mostly localized close to the upstream end near the openings through which the batch materials are introduced, the rest of the flue gas being removed close to the downstream part so as to maintain dynamic sealing with respect to the surrounding atmosphere.

20 Claims, 3 Drawing Sheets

(56) References Cited

U.S. PATENT DOCUMENTS

| | | | |
|---|---|---|---|
| 4,381,938 A * | 5/1983 | Claflin | 75/375 |
| 4,432,780 A * | 2/1984 | Propster et al. | 65/473 |
| 4,599,100 A * | 7/1986 | Demarest, Jr. | 65/134.4 |
| 4,659,356 A * | 4/1987 | Lawhon et al. | 65/27 |
| 5,081,937 A * | 1/1992 | Ishida et al. | 110/246 |
| 5,123,942 A * | 6/1992 | Argent et al. | 65/27 |
| 5,417,731 A * | 5/1995 | LeBlanc et al. | 65/134.4 |
| 5,655,464 A * | 8/1997 | Moreau et al. | 110/335 |
| 5,755,846 A * | 5/1998 | Wagner et al. | 65/134.4 |
| 5,766,296 A * | 6/1998 | Moreau | 65/134.5 |
| 5,807,418 A * | 9/1998 | Chamberland et al. | 65/134.4 |
| 5,851,256 A * | 12/1998 | Quirk et al. | 65/134.6 |
| 5,855,636 A * | 1/1999 | Alexander | 65/27 |
| 5,906,119 A * | 5/1999 | Boillet | 65/134.4 |
| 6,079,229 A * | 6/2000 | Legiret et al. | 65/135.9 |
| 6,253,578 B1 * | 7/2001 | Kobayashi et al. | 65/134.4 |
| 6,289,694 B1 * | 9/2001 | Pieper | 65/29.19 |
| 6,470,710 B1 * | 10/2002 | Takei et al. | 65/134.1 |
| 6,532,771 B1 * | 3/2003 | Kobayashi et al. | 65/134.4 |
| 6,789,396 B2 * | 9/2004 | Olin-Nunez et al. | 65/134.8 |
| 2003/0010061 A1 * | 1/2003 | Ha et al. | 65/32.5 |
| 2003/0037571 A1 * | 2/2003 | Kobayashi et al. | 65/134.4 |
| 2006/0204417 A1 * | 9/2006 | Rini et al. | 423/210 |
| 2007/0137259 A1 * | 6/2007 | Borders et al. | 65/454 |

OTHER PUBLICATIONS

Kobayashi, Hisashi et al., "Advances in Oxy-Fuel Fired Glass Melting Technology", Proceedings of International Congress on Glass, pp. 1-17, XP002496632, (2004).

International Search Report issued Jun. 5, 2009 in PCT/EP09/53522 filed Mar. 25, 2009.

U.S. Appl. No 12/934,540, filed Sep. 24, 2010, Douxchamps, et al.
U.S. Appl. No 12/934,412, filed Sep. 24, 2010, Douxchamps, et al.
U.S. Appl. No 12/934,489, filed Sep. 24, 2010, Douxchamps, et al.

* cited by examiner

GLASS MELTING FURNACE

The present invention relates to glass melting furnaces in which the melting energy is produced essentially by burners fed with fuel and with oxygen or a gas very rich in oxygen. These furnaces are usually termed "oxy-fuel combustion" furnaces.

The auxiliary use of oxy-fuel combustion burners is well known in glass melting furnaces. On furnaces operating conventionally with air, an oxy-fuel combustion burner or a limited number thereof are then added. The purpose of introducing these additional burners is generally to increase the capacity of existing furnaces, possibly when their performance is seen to decline owing to their old age. This situation is found for example when the regenerators associated with such furnaces have become degraded and are no longer able to heat the air used for combustion sufficiently. The capacity of a given furnace may also simply be increased by introducing additional energy sources.

As a general rule, the additional oxy-fuel combustion burners are placed close to the zone in which the batch materials are charged into the furnace. These burners thus melt the batch materials. The addition of a few oxy-fuel burners in large-capacity furnaces is usually accomplished without any substantial modification to the general operation of the furnace in the sense that, in particular, the regenerators continue to operate and therefore handle both the combustion flue gas arising from burners operating with air and that arising from burners operating with oxygen.

Beside the fact of having an additional energy source, these systems operating in what is called "oxy-boosting" mode do not provide the benefit of all the known advantages that may result from oxy-fuel combustion. Among the number of potential advantages are mainly a lower energy consumption and reduced emissions of undesirable flue gas.

Oxy-fuel combustion provides an energy saving at least for the reason that the energy of combustion gas is not partly absorbed by the nitrogen of the air. In conventional furnaces, even if some of the energy carried off with the nitrogen is recovered in the regenerators, the flue gas finally discharged still gives off a significant amount of energy. The presence of nitrogen contributes to this loss.

Reducing the energy consumption by a production unit in question has in addition the advantage of consequently limiting the carbon dioxide emissions and therefore of meeting the statutory requirements in this field.

The presence of nitrogen is also a source for the formation of nitrogen oxides, called NOx, the emission of which is practically prohibited because of damage due to the presence of these compounds in the atmosphere. In practice, users strive to operate furnaces under conditions leading to emissions that are as low as possible. In the case of glass furnaces, these practices are not sufficient to meet the very stringent standards in force, and it is necessary to carry out an expensive flue gas decontamination operation by the use of catalysts.

By using oxygen, it is possible to circumvent the problems associated with the nitrogen in the air, something which is not the case in oxy-boosting techniques.

Despite the abovementioned advantages, the use of oxy-fuel combustion in large glass furnaces remains to be developed. The reasons for this are of several types. Firstly, the use of oxygen is necessarily more expensive than that of air.

The economic assessment of the use of oxy-fuel combustion is positive only if it is possible to recover a significant amount of heat from the flue gas. Hitherto, recovery of this energy does not seem to have been accomplished satisfactorily and the potential energy saving has not been actually achieved.

Moreover, the implementation of oxy-fuel combustion still poses technical problems that counteract certain advantages. One recognized difficulty is due to the corrosion of the refractories, this corrosion reducing the lifetime of the silica refractories of the furnace roof. This is because the high $H_2O$ content of the combustion atmosphere causes two deteriorating effects:

the first is due to the diffusion of $H_2O$ into the glassy phase of the refractory blocks; and the second is due to the condensation of sodium hydroxide present in the atmosphere on the refractory bricks, which entails a high degree of oxidation, in fact six times higher in the case of an oxy-fuel combustion furnace.

To obviate these conditions, it is necessary to use materials that are more corrosion-resistant than those normally chosen. Usually, for various reasons, the roof of large glass furnaces is made of silica bricks. In the case of an oxy-fuel combustion furnace, it is necessary instead to use materials such as alumina, AZS or spinels. However, these materials are more expensive and also pose problems because they are significantly heavier.

Further, new problems have also appeared in practice that require specific new operating conditions to ensure that this technique be effectively used in applications that the theory suggests would be advantageous. The invention relates to ways of implementing the oxy-fuel combustion technique in large glass furnaces that form the subject matter of the claims appended to the present description.

The inventors addressed the problem of the economics of this oxy-fuel combustion technique. In particular, they provide a way of ensuring that the furnace flue gas energy is largely recovered and used for preheating the oxygen and, where appropriate, the fuels consumed. Some of the flue gas heat may also be used for preheating the batch materials charged into the furnace.

The economics, especially as regards energy, requires the flue gas heat to be recovered. The principle is known but the difficulty stems from employing recovery techniques for operating the furnace itself.

The inventors have chosen to utilize the flue gas energy, especially to preheat the oxygen. For obvious reasons, the use of regenerators for this recovery is excluded. The operation has to be carried out in specific heat exchangers, which operation is not very easy because hot oxygen is extremely corrosive for all materials with which it is in contact. This corrosive character is all the more pronounced the higher the temperature reached by the oxygen.

It is also necessary according to the invention for the furnaces in question to be substantially free of a nitrogen-containing atmosphere. For this reason, unlike certain solutions proposed previously, it is preferable to ensure that all the burners of the furnace operate in oxy-fuel combustion mode. Although nevertheless it is possible to maintain part of the combustion in air-fuel combustion mode, the energy generated by oxy-fuel combustion represents at least 65%, preferably at least 80% and even more preferably at least 90% of the total energy consumed in the furnace.

The use of an air-fuel combustion fraction may stem from a limited number of burners operating entirely in air-fuel combustion mode, but it may also stem from the use of oxygen having a certain content of air. In the latter case, because the burners used in oxy-fuel combustion mode have particular characteristics, the oxygen/air mixture must have an oxygen content of at least 80% and preferably at least 90%.

To simplify matters in the rest of the description, reference is made both to oxy-fuel combustion and to "oxygen" combustion. Developments in this subject, unless otherwise indicated, cover the use of oxy-fuel combustion with an oxygen that may contain a small amount of air, or an assembly comprising a limited part operating in air-fuel combustion mode combined with predominantly oxy-fuel combustion.

Independently of the constituents of the furnace atmosphere resulting from the combustion, it is also necessary to prevent as far as possible any penetration of air coming from the outside, on the one hand to avoid an energy loss corresponding to heating this air, but most importantly to prevent as far as possible undesirable NOx formation due to this air reaching the high temperatures of the combustion flame (these temperatures are around 1800 to 2300° C. depending on the type of oxygen burner chosen).

Irrespective of the construction envisaged, glass furnaces cannot be kept completely impermeable to the external atmosphere. The efforts reported for this purpose have related mainly to the installation of physical barriers that limit the flow of gas from the outside into the furnace. These measures are certainly useful, but appear to be insufficient if it is desired to maintain an atmosphere essentially formed by the combustion gases.

According to the invention the intake of the surrounding atmosphere is consequently prevented by arranging the furnace in such a way that dynamic sealing develops. To do this, according to the invention, the flow of flue gas in the furnace has to be regulated in the manner explained in detail below.

In large glass melting furnaces, especially those using regenerators, gases flow in the furnace transversely. The burners are distributed on either side of the tank containing the molten glass and they operate alternately. During one period, all the burners located on one side of the furnace are activated and the corresponding flue gas is discharged via the ducts located on the wall that faces them. The flue gas is passed over the regenerators corresponding to the side in question. During the next period, it is the burners on the other side that are in action, with the air flowing over the preheated regenerators, and so on.

In the case of oxy-fuel combustion furnaces, the burners located on either side of the furnace operate continuously. The distribution of the burners on both sides is not determined by the need for this alternation, because it does not exist, but more because of the desire to optimize the heat exchange between the flames and the glass melt or between the flames and the supernatant batch materials.

The flames of oxy-fuel burners are, for the same power, shorter than the flames of air-fuel burners. The reason for this is in particular because the gas flow is less voluminous because of the absence of nitrogen. In order for the energy distribution to be as uniform as possible, for a similar furnace width, it is therefore desirable to place the burners on both sides so that the surface of the melt is best covered.

Any increase in the emission velocity of the oxygen-fuel combustion gases, which could lengthen the flame, are not desired, in particular so as not to promote dust fly-off.

It is also preferable to ensure that the flames develop in as little disturbed a manner as possible. To prevent collision between oppositely positioned flames, the burners are therefore advantageously staggered.

According to another specific feature of oxy-fuel combustion flames, to achieve combustion staging over the length of the flame, which is preferable, as in air-fuel combustion burners, it is advantageous to ensure that the flames from these burners develops as a sheet lying in a plane substantially parallel to the surface of the glass melt. This is obtained for example by means of burners having a plurality of oxygen injection nozzles located on either side of the fuel intake nozzle, all these nozzles being substantially aligned so as to be parallel with the surface of the melt.

The flue gas from the flames does not flow transversely, as in air-fuel combustion. The flow is organized according to two objectives.

Firstly, it is necessary to ensure that heat transfer from the flue gas to the glass melt is as great as possible. In other words, efforts are made to ensure that the flue gas temperature at the outlet of the furnace is as low as possible, also taking into account the fact that oxy-fuel combustion flames are at a higher temperature and that overall the flue gas is also at a higher temperature than in air-fuel combustion mode.

To achieve greater heat exchange, the residence time in the furnace is extended.

Owing to the fact that, for the same amount of energy dissipated, the flue gas volume is reduced by more than a half compared with that in air-fuel combustion, for a furnace of identical volume, all other things being equal the flue gas residence time would necessarily be extended.

Secondly, the provisions relating to flue gas flow also help to improve the heat transfer with the melt. In particular, this results from the positioning of the flue gas outlets, the location of the burners and the distribution of the power developed locally by each of these burners.

According to the invention, and to achieve better energy transfer with the melt and with the batch materials, it is necessary to make the flue gas, or at least the major portion thereof, flow in the opposite direction to the flow of the melt. Thus, the temperature of the flue gas as it progresses through the furnace decreases up to the point where it is discharged from the furnace.

For this reason, the discharge of the flue gas, or at least the major portion thereof, is localized close to the point where the batch materials are charged into the furnace. One option is to ensure that the flue gas is discharged via ducts that are separate from those via which the batch materials are fed into the furnace. Another option is for this discharge to take place via the charging channels themselves, and therefore countercurrently with the batch materials. In the latter option, it is necessary in particular to avoid the risk of any agglomeration due to the water vapour contained in the flue gas condensing upon contact with these "cold" batch materials.

To have the best heat transfer, most of the flue gas is discharged at a point close to where the batch materials are charged into the furnace. In practice, this means at least 65%, and preferably at least 75%, of the flue gas.

The excess flue gas, that is not discharged as indicated above, follows a path intended in particular for maintaining dynamic sealing with respect to the external atmosphere. At least part of this excess is advantageously discharged towards the downstream end of the furnace. As indicated, this fraction of the flue gas is as small as possible, advantageously being less than 35%, and preferably less than 25%, of all of the flue gas.

The downstream discharge of the flue gas takes place beyond the last burners. It is necessary to prevent the combustion gases from being discharged before as complete as possible heat transfer has taken place. To do this, these gases must remain for some time in the furnace, hence the need not to place the burners too close to the discharge ducts.

The presence of outlets downstream of the burner zone makes it possible in particular to prevent air coming from this zone passing through the burner zone, since most of the air downstream comes from the conditioning zone. The NOx content is systematically detected at the upstream outlet. If the NOx content proves to be too high, it is possible to correct this content according to the invention by regulating the discharge streams. Increasing the downstream discharge entrains more air coming from the downstream of the furnace and prevents this nitrogen-containing air from passing through the flames and forming NOx.

Advantageously, these regulations result in as low a nitrogen content as possible in the flue gas discharged into upstream outlets. This content is preferably maintained at below 10% and more preferably below 5%.

The temperature of the downstream discharge gas is generally slightly higher than the temperature of the flue gas discharged upstream, for the reason that the flue gas is in contact with the least hot zones of the furnace because, in particular, close to the furnace charging point, there are normally no burners and because the covering of supernatant batch materials absorbs a substantial portion of the energy in melting these batch materials.

The flue gas residence time in the furnace depends on a number of conditions. These include, apart from the organization of the flue gas flow as indicated above, the flow rate of the flue gas produced and the volume occupied by this flue gas within the furnace must also be added. For a given flue gas flow rate, the average residence time depends on the available volume. The larger the volume, the longer the residence time and, in principle, the more complete the heat transfer.

In practice, increasing the volume of the furnace has a limited influence and may lead to less satisfactory economics if it is not well controlled, for the following reasons. Experience shows firstly that the heat transfer to the mass to be melted and to the melt mainly takes place through radiation. Flue gas convection contributes only less than 10% of the supply, and this is very often less than 8%. Under these conditions, increasing the flue gas residence time adds little to this convective supply. Moreover, increasing the volume of the furnace also leads to additional investment in terms of refractories and results in an additional loss of energy dissipated to the outside, whatever the quality of the furnace insulation, this loss depending on the area of the walls exposed to the surrounding atmosphere.

Advantageously, the discharge temperature of the flue gas is slightly reduced as a result of its residence in the furnace. Ordinarily, in an air-fuel combustion furnace, the flue gas is at a temperature below 1650° C., preferably below 1600° C. and particularly preferably below 1550° C. However, in the case of an oxy-fuel combustion furnace, it is at a temperature below 1500° C., preferably below 1450° C. and particularly preferably below 1350° C.

Moreover, the volume of the furnace also determines the velocity of the flue gas therein. It is preferable to ensure that the flue gas flow velocity in the furnace remains moderate so as to avoid disturbing the flames. It is also necessary to prevent the fly-off of dust as the gas passes over the batch materials, which dust would then have to be removed before the gas passes through the heat exchangers.

From experience, it is found that the average residence time of the flue gas in an air-fuel combustion furnace is 1-3 seconds. In the case of the invention, with an oxy-fuel combustion furnace, the mean residence time of the flue gas lies between 10 and 40 seconds and more advantageously between 15 and 30 seconds.

The positioning of the burners, or better still the distribution of the energy supply already mentioned, is an important factor not only as regards energy consumption of the furnace but also the quality of the glass produced.

All large glass furnaces conventionally comprise two zones, corresponding to melting and to refining respectively.

Beyond the refining zone, the glass continues to pass through a conditioning channel in which the glass temperature is gradually lowered until it reaches its forming temperature. To manufacture flat glass by the "float" technique, this temperature is around 1100° C.

Usually, the refining zone is separated from the conditioning zone by a neck, which makes it possible in particular to restrict the atmosphere of one zone passing into the other. According to the invention, efforts are made to minimize the corresponding opening and consequently the flow of the atmosphere coming from the conditioning zone entering the refining zone. In all cases, the flue gas must not penetrate into the conditioning zone, otherwise dust still in suspension could be entrained therewith and deposited on the surface of the glass.

The ingress of gas not arising from the combustion, and in particular the gas penetrating via the neck, is also limited as far as possible and advantageously does not exceed 15%, and preferably is less than 10%, of the total volume of gas flowing through the furnace.

The distinction between melting zone and refining zone involves what is conventionally called "convection currents" in the glass. These convection currents are generated by two phenomena: natural convection and forced convection. Firstly, natural convection movements are associated with the temperature conditions and with the power distribution along the furnace (called the "fire curve"). Secondly, the forced convection movements are associated with the modification of the flow caused for example by bubblers, mixers or dams. These two convection phenomena progress the glass, which, in the melting zone, develops forwardly flowing movements on the surface and rearwardly flowing movements close to the bottom of the furnace. In the refining zone, the direction of circulation is reversed.

In general, the melting zone is that requiring the greatest energy supply, and therefore that in which the overall power of the burners is greatest. The distribution is such that this supply is not less than 40%, preferably not less than 50%, of the total. It may represent up to 80% of the supply, but preferably does not represent more than 70% of the energy delivered. The percentages in question relate to the power delivered by the burners that are suspended above the zone in question.

In order for the furnace to be operated as efficiently as possible, the burners must be suitably distributed along the furnace. However this distribution is not uniform.

It is necessary to avoid the presence of the most powerful burners close to the flue gas outlets so as to minimize energy losses in the flue gas. However, if the glass temperatures beneath the blanket of molten batch material are too low, with the risk of the glass solidifying, boost burners may be positioned close to the batch material charging points, either mounted in the walls of the furnace or in the roof. An alternative way of minimizing the energy losses in the flue gas is to use electro-booster (the glass being heated by electrodes passing through the bottom of the furnace). Heating by means of submerged electrodes has the advantage of providing temperature control precisely adjusted to the local requirements. Moreover, the efficiency of this electrical energy supply is much greater than in flame heating, thereby enabling it to be maintained at relatively low levels. In general when electrical energy is supplied, it represents no more than 10% of the total amount of energy developed in the furnace, and is very often less than 5% thereof.

The burners are located at a certain distance away from both the batch charging points and the upstream flue gas outlets. The necessary supply of energy in this zone therefore results firstly from the convection currents within the melt, these being more intense the greater the temperature difference between the surface covered with the batch materials to be melted and that further downstream in the molten glass. This energy supply secondly comes from the flue gas, which flows countercurrently, being directed towards the outlets provided upstream. Overall, the temperature in this upstream zone is not the highest in the furnace, but it does remain sufficient to sustain the melting.

Although the first burners are located a certain distance away from the flue gas discharge points, so as not to retard batch melting, it is nevertheless necessary to position these first burners in a zone of the furnace in which the melt is still covered with unmelted batch materials. This zone preferably does not exceed one half of the length of the furnace, and more particularly preferably no more than one third thereof. This is because it is necessary, apart from melting this "blanket", to ensure that the particles of material dispersed in the melt have melted perfectly and to ensure that the temperature has risen up to the highest point that enables not only the melting process to be completed but also the melt to be homogenized.

Beside the positioning of the burners, the distribution of the delivered power is significant. The power of the burners is highest in that part of the melting zone close to the refining zone, in which part the temperature reached is the highest.

In the refining zone, the temperature of the melt must be generally maintained, the necessary energy supply therefore being more limited. Preferably, the burners in this zone are located in the part closest to the melting zone. Preferably, the energy supply decreases in the direction of advance through the refining zone.

It is necessary to be able to make variations to the furnace operating parameters, particularly the total applied power. These variations commanded by the nature of the batch materials, variations in output, etc. are usually of limited magnitude. To maintain the optimized energy distribution conditions as far as possible, the variations conventionally relate essentially to the burners located furthest downstream in the direction of advance of the glass. This particular aspect has the consequence that there are variations in flue gas volume in this zone. Consequently, to avoid modifications further upstream because of the break in dynamic equilibrium, it is advantageous according to the invention to regulate the flue gas flow rate by means of outlets placed in the downstream zone of the furnace, as indicated above.

In a conventional furnace operating in air-fuel combustion mode, the burners are placed in the side walls of the furnace in such a way that the flames develop close to the surface of the melt. This arrangement stems partly from the limited residence time in the furnace of the flue gas, which is essentially discharged directly on that side of the furnace facing the burner. It appears to be necessary to maximize heat exchange, including convective heat exchange, during this brief residence time and therefore necessary to ensure that the flames are also in contact with the surface of the melt.

In the case of operation in oxy-fuel combustion mode as in the invention, the contribution to heat supply by convection is limited, as indicated above. It is therefore preferable to position the burners on the side walls at a certain distance from the surface of the melt, guaranteeing suitable distribution of energy radiated directly from the flame both towards the melt and towards the roof.

Preferably, the positioning of the burners results in flames being developed in planes approximately parallel to the surface of the melt and at a distance of at least 0.25 m above this surface, and preferably at least 0.40 m above it. This distance may be up to 1.0 m, but is preferably less than 0.80 m.

As indicated above, the use of oxy-fuel combustion modifies the furnace atmosphere, which contains practically no nitrogen. On the other hand, it is relatively richer in water vapour. This feature has a significant effect on the melting behaviour. In particular, an increase in the water content above the melt is accompanied by an increase thereof in the glass.

The presence of a high water content so promotes degassing of the glass and makes refining easier.

One possible downside of a high water content is the formation of foam on the surface of the melt. The presence of foam is undesirable, especially as it forms an obstacle to good heat exchange. Means are known for reducing the amount of foam if this should develop. These means, independently of the measures taken to prevent foam from appearing, modify the surface tension of the glass, for example using the technique described in the publication EP 1 046 618.

Another means for minimizing the risk of foam formation in the zones where it may be particularly problematic, especially in the refining zone, consists in limiting the water vapour content by the choice of fuel used in this part of the furnace.

Oxy-fuel combustion may be carried out with various types of fuel without losing the benefit of the abovementioned advantages. The fuels most often used are either natural gas or liquid fuels.

As regards the water vapour content, this is higher when a gas is used than when liquid fuels are used. For this reason, apart from the abovementioned energy cost questions, it may be advantageous according to the invention for the burners located in the refining zone to be fed with liquid fuel. In this way, the risk of foam formation in that part of the furnace where it could be the most prejudicial is reduced.

The economic assessment of oxy-fuel combustion is based, on the one hand, on the cost of oxygen and the cost of the adapted refractories and, on the other hand, on the fuel savings and the savings relating to the partial elimination of flue gas decontamination. To have a positive outcome, it is necessary to recover a significant portion of the heat contained in the flue gas exiting the furnace. In practice, as in the case of air-fuel combustion furnaces, the most efficient use consists in heating the reactants introduced into the furnace, namely oxygen, fuel and possibly batch materials.

By comparison with air-fuel combustion techniques, especially those using regenerators, one difficulty stems from the nature of the necessary installations. The regenerators can receive the flue gas practically as collected at the outlet of the furnace. The materials of which the regenerators are made, especially the linings, generally made of refractory ceramics, have no difficulty in withstanding the temperatures of the flue gas and the dust that this gas may convey. Subsequently, the preheating of the air in the hot regenerators requires no special precautions to be taken. In contrast, much more stringent precautions are required when heating products used for oxy-fuel combustion, particularly when heating oxygen. The installations in which oxygen flows must be completely gastight, resistant to the high temperatures and resistant to oxygen conveyed at these temperatures.

Regards the flue gas, efforts have to be made to ensure that they entrain a minimum amount of dust. By having the flames at a certain distance away from the surface of the melt, particularly in the zones where the melt is covered with materials that have not yet melted, contributes to minimizing this entrainment. What also contributes is the fact that the burners, when they are staggered, minimize turbulence that could result from the impact of the gas streams emanating from burners that face one another.

The average velocity of the flue gas in the longitudinal direction does not as a general rule exceed 3 m/s and is usually less than 2 m/s. In the flames, this velocity is much higher, around 30 to 100 m/s, this velocity being normally lower than that in air-fuel combustion flames.

According to the invention, the oxygen is preheated advantageously in heat exchangers made of steel exhibiting excellent hot oxygen resistance. Heat exchangers and materials suitable for this usage are described in the unpublished European Patent application No. 07/107 942 filed on 10 May 2007.

The hot oxygen delivered by the heat exchanger is brought to a temperature which may be at most 650° C. This value depends on the resistance that can be achieved with metal alloys having the best characteristics. This limit makes it possible to guarantee a duration of use in relation to the type of installation in question.

In practice, for better safety it is preferable to keep the temperature of the oxygen below 600° C.

In order for the oxygen preheating to be sufficient to improve the economics significantly, it is preferred to set a temperature that is not below 350° C.

Likewise, the fuel used is advantageously preheated, whether this is natural gas or liquid fuel. The temperatures reached by the fuel do not depend on the resistance of the installations. However, they may depend on possible degradation of these fuels. In particular, it is necessary to prevent them "cracking", even partially, which would have the result of fouling the installations. For natural gas, the preheat temperature is advantageously below 650° C. and preferably below 550° C. For heavy fuel oils, the temperature is generally lower, not exceeding 180° C. and preferably not exceeding 150° C.

Flue gas heat recovery is largely sufficient to allow the oxygen and the fuel to be heated to the temperatures indicted, independently of the efficiency of the heat exchange when this is carried out under the conditions given in the above-mentioned patent application. It is also possible with the excess to preheat the batch materials or to feed boilers, whatever the usage of the steam produced.

The invention is described in certain detail below with reference to the plates of drawings in which.

Figure 1:
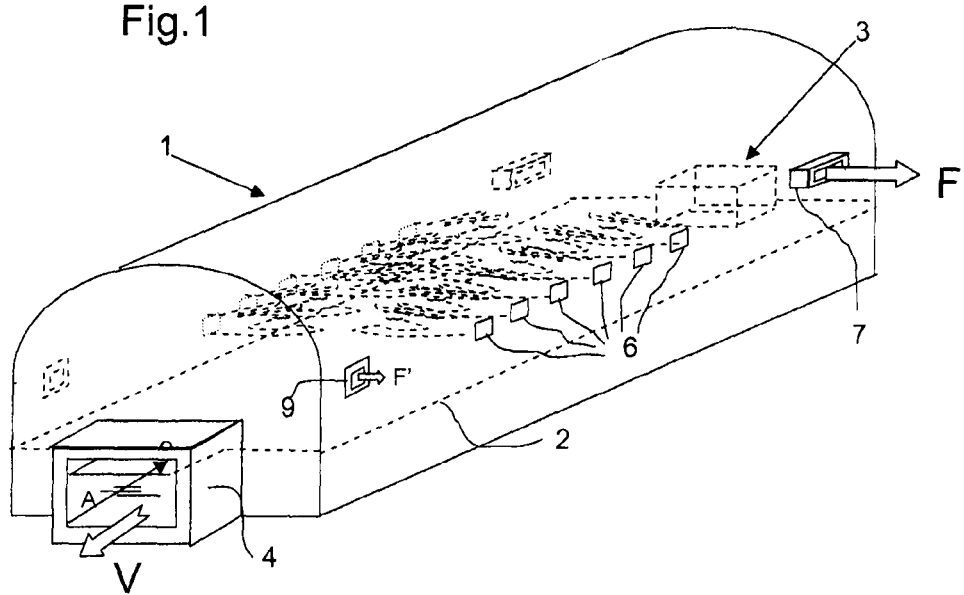
FIG. 1 is a perspective schematic view of a furnace according to the invention.

The furnace shown in FIG. 1 is of the type used for high-volume glass productions, such as those serving for feeding flat glass production units employing the float technique. Furnaces of this type operate continuously and produce glass in quantities that may be up to 1000 tonnes/day. To achieve this performance, furnaces must have a power of up to 60 MW.

The furnace 1 comprises a tank placed in an enclosed chamber. The assembly is made of refractory materials that are resistant to high temperatures, to flue gas corrosion and to attack by the molten materials. The level of the melt in the tank is shown by a dotted line 2.

The furnace is fed with batch materials at one of its ends. The opening via which these batch materials are charged is shown at 3. In practice, to make distribution over the surface of the melt easier, several charging points are usually provided. The output of molten glass, represented by the arrow V, is at the opposite end via a neck 4 of small width compared to that of the tank. Most usually, the bottom of the neck 4 is level with the bottom of the furnace.

The neck is not completely submerged in the molten glass—a gap remains between the top of the neck and the surface of the glass layer. The operating conditions, as regards the gas streams in the furnace, are regulated in such a way that the furnace atmosphere does not pass through the neck, so as to avoid any risk of entraining suspended dust. To ensure this operation, it is preferable to maintain a slight gas stream, indicated by the arrow A, flowing countercurrently with the stream of molten glass. Being intended only to prevent a gas stream in the opposite direction, this stream A is kept as slight as possible. It is important to minimize it as it is normally formed by the air present above the conditioning zone, not shown in FIG. 1 (but with the reference 5 in FIG. 2), which comes after the neck.

Burners positioned as indicated at 6 are placed along the side walls of the furnace, on each side thereof, so that the flames extend practically over the entire width of the tank. The burners are spaced apart so as to distribute the energy supply over a major portion of the length of this melting/refining tank.

The combustion gas F is discharged predominantly via the outlets 7 located near the furnace charging zone and at a certain distance from the closest burners. In the representation shown (FIGS. 1 and 2), two outlets 7 are placed symmetrically on the side walls, whereas the batch materials (MP) are charged along the axis of the furnace. This is a preferred embodiment, but other arrangements are also possible such as, for example, the outlet of gas in the wall 8 closing off the furnace in its upstream part. These outlets may also be distributed differently, the important point being to ensure that the flue gas flows back countercurrently with the flow of glass V in the furnace. Where appropriate, the discharge of the flue gas may especially take place, at least partly, via the batch charging opening or openings.

As indicated above, according to the invention, measures are taken to ensure that the enclosure of the furnace is practically impermeable to the penetration of external air. Flow of flue gas towards the upstream end prevents penetration on this side of the furnace. The passageways possibly provided on the side walls are also essentially impermeable to the penetration of ambient air. To repel the small amount of air that might come from the conditioning part 5, a very limited flow of flow gas is advantageously provided towards the downstream end of the furnace. This flue gas F' is discharged via the outlets 9.

In adjusting the amount of air flowing from the conditioning zone to the refining zone, in addition to the gas flows generated by the burners, it is also important, as indicated previously, to be able to modulate the amounts of flue gas extracted in the downstream zone of the furnace and which is discharged via the outlets 9.

A large-capacity glass furnace conventionally comprises two zones one called the melting zone and the other the refining zone. These two zones are not delimited in FIGS. 1 and 2.

The boundary between melting and refining is not generally apparent in the structure of the furnace. In particular, if a dam is placed on the bottom of such a furnace, this dam does not ordinarily coincide with this boundary, even though it does play a part in determining where this boundary is located.

Figure 2:
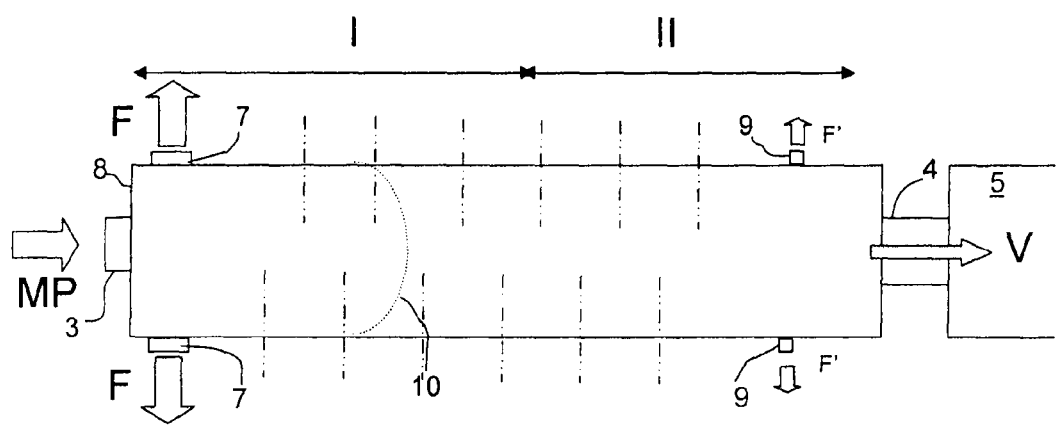
FIG. 2 illustrates schematically, in top view, the arrangements shown in FIG. 1.

The distinction between melting zone and refining zone is in all cases a functional distinction. It corresponds to the glass circulation in the tank. This comprises a first convection current in the melting part and a second convection current in the refining part that rotates in the opposite direction to the first current. In the absence of a means having a direct influence on the circulation, the position of the melting zone/refining zone boundary is determined by a number of operating parameters that include, in particular, the distribution of the energy by the burners. In FIG. 2, these two zones are shown as I and II.

As a general rule, the energy supply needed to melt the batch materials is greater than that to keep the glass at temperature for refining. Consequently, the number of burners, and especially the power that they deliver, is greater in the melting zone.

Although it is worthwhile supplying the maximum amount of energy for melting, and therefore right from charging the furnace with the batch materials, it is also necessary to avoid positioning the first burners too close to the flue gas outlets 7, otherwise this very hot flue gas would carry away with it an excessive amount of energy. The choice of where the first burners are positioned is therefore the result of a compromise. The first burners are positioned in such a way that they are located above the supernatant materials.

Again to limit energy losses via the flue gas as indicated above, it is also possible to vary the power of the burners according to their position. The first burners may especially operate at lower power than that of the burners positioned further downstream.

In the operating modes that have proved to be most advantageous, the "fire curve", i.e. the temperature distribution along the furnace, firstly progresses from the upstream end as far as a central part close to the start of the refining zone. Thereafter, the temperature varies a little, decreasing slightly as far as the neck 4 preparing the passage into the conditioning zone. For this reason, the downstream end of the furnace normally has no burners.

The distribution of the burners is shown in FIG. 2 by the axis thereof. They are preferably staggered on either side of the tank so as to ensure that the flames emanating in opposite directions do not impinge on one another. They are separated from one another laterally so as to best cover the surface of the melt. In this sense too, the burners used are advantageously of the type that develops a flame in the form of a sheet approximately parallel to the surface of the melt. A nominal power of each burner depends on what burners are chosen and on the number of burners used.

Figure 5:
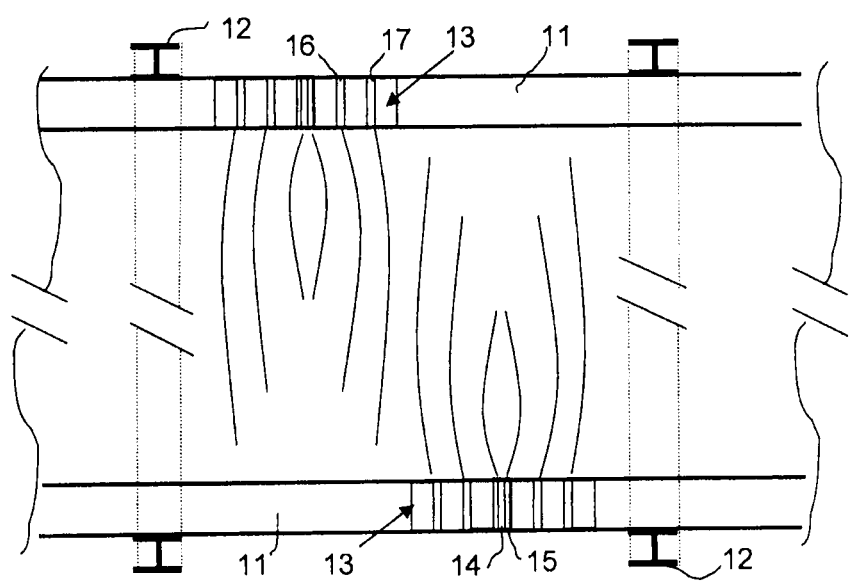
FIG. 5 shows a partial top view of the arrangements of the burners in a furnace according to the invention.

The space available on the side walls of the furnace 11 (FIG. 5) is limited by the presence of the metal reinforcement 12 supporting the roof of the furnace. The beams constituting this reinforcement are closer together the wider the furnace and the heavier the refractory ceramic materials. For very wide furnaces, only two flat burners 13 of the type described in the publication WO 2004/094902 may be fitted between two successive beams, one on each side of the furnace. These burners organize the staged combustion, starting from a central fuel feed 14, concentric with a first oxygen feed 15, then by means of several secondary oxygen feeds 16, 17 parallel to the first, these being spaced apart and lying in the same approximately horizontal plane. These staged-combustion burners 13 produce a flame that develops in a plane approximately parallel to the surface of the melt. By their construction, these burners have a certain width, hence the limited number thereof between two beams.

As shown in FIG. 1, the burners open into the enclosure of the furnace at a certain distance above the surface of the melt. This arrangement, as explained above, enables the radiated energy from the flame to be correctly distributed and it also makes it possible, combined with the height of the roof, to ensure correct flow of the combustion gases, especially those directed towards the main outlets 7 returning towards the upstream end of the furnace. Unlike in air-fuel combustion furnaces, the flue gas of which follows an essentially transverse path, in the case of oxy-fuel combustion furnaces according to the invention the flue gas is directed along the length of the furnace and therefore transversely to the direction of the flames that the flue gas must not disturb. By providing space both beneath the flames and above them, the flue gas can travel without excessive turbulence prejudicial to correct development of the flames.

The flue gas discharged from the furnace is used in devices intended to recover some of the energy carried out by this gas. Although in principle it is possible to carry out direct heat exchange between the flue gas and the product to be preheated, for the sake of operating optimally, in terms of efficiency and safety, more complex heat exchange installations are used.

Figure 3:
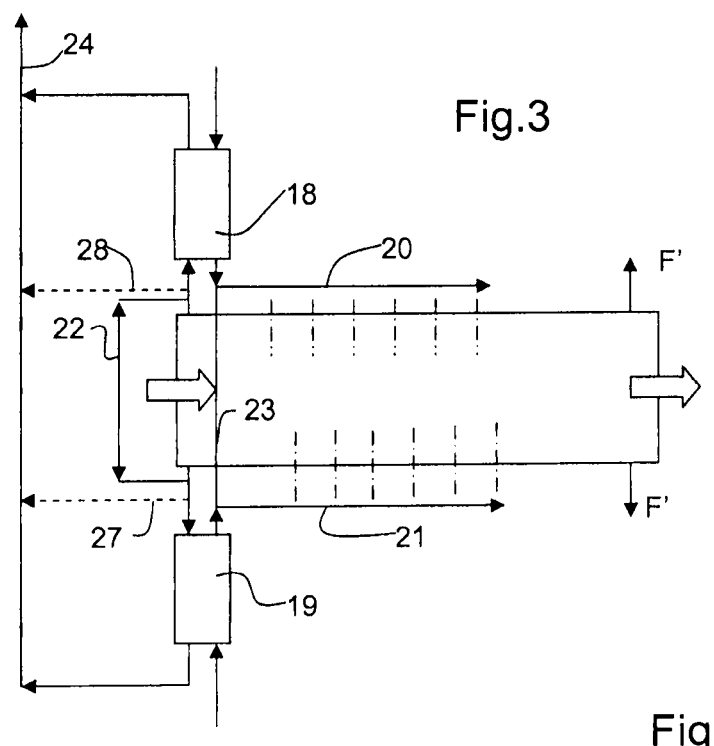
FIG. 3 is an overall schematic diagram of the heat exchange circuits used for a furnace according to the invention.

However, in FIG. 3, for the sake of simplicity, the heat exchange installations are shown overall as 18 and 19. In these installations, oxygen and/or fuel is heated before being conveyed to the burners by the lines 20, 21.

Flue gas on leaving the furnace is initially at temperatures of around 1200 to 1400° C. At such temperatures, it is preferable for the flue gas to pass through a recuperator, in other words a summary heat exchanger that enables the temperature of the flue gas to be lowered with a view to treating it before it is discharged into the atmosphere via a chimney 24. The recuperator is a system in which a fluid flows countercurrently with the flue gas. In its most elementary form, this comprises two concentric pipes. A more elaborate system is formed by a bundle of tubes passing through a chamber in which the heat-transfer fluid flows. The two types may be combined.

After this recuperator, the flue gas is still at a high temperature, generally not below 700° C. except in the case of very large recuperators being used. Before being discharged, the flue gas undergoes a decontamination treatment so as in particular to remove sulphur oxides. This removal operation is performed for example in electrofilters. To avoid damaging these filters, the temperature must be lowered further, down to about 300-400° C. One economic way of doing this consists in diluting the flue gas with ambient air.

Lowered down to these temperatures, the mixture can still be used, for example as a means for feeding steam-generating boilers. The steam in question can be used in particular to preheat liquid fuels. These are advantageously preheated to temperatures of between 100 and 150° C., preferably between 120 and 140° C.

The fluid heat exchanger used in the recuperators is for its part used as indicated below with reference to FIG. 4.

In the representation shown in FIG. 3, two heat exchange installations 18, 19 are placed one on each side of the furnace. The two flue gas lines are connected by a line 22. This latter line, should it be necessary to carry out maintenance or repair on one of the installations, allows at least some of the flue gas to be momentarily transferred to the second installation, and the remainder may also be discharged via the line 27 or the line 28. Similarly, a line 23 is used, if needed, to feed both sides of the furnace with heat-transfer fluid.

Lines 27 and 28 are used, where appropriate, to avoid passing the flue gas through the recuperators, sending them directly to the discharge point 24.

In FIG. 3, the flue gas F' exiting downstream is not shown as pipes to the heat exchangers. Depending on the configuration of the installation, it is also possible to connect these outlets in such a way that all the flue gas is recovered. If the "recoverable" energy is more than that which can be utilized, this recovery may where appropriate be omitted.

For the reasons indicated above, it is advantageous to carry out the heat exchange in two steps. In a first "recuperator" the flue gas heats up an intermediate fluid, for example air, nitrogen, $CO_2$ or any appropriate fluid which for example circulates in a loop between this recuperator and a heat exchanger, or better still several heat exchangers, in which heat exchanger(s) it heats the oxygen or the fuel. An alternative situation as regards the intermediate fluid, such as air, is not to use the loop but to recover the hot air at the outlet of the secondary heat exchangers by a boiler or another energy recovery means.

Figure 4:
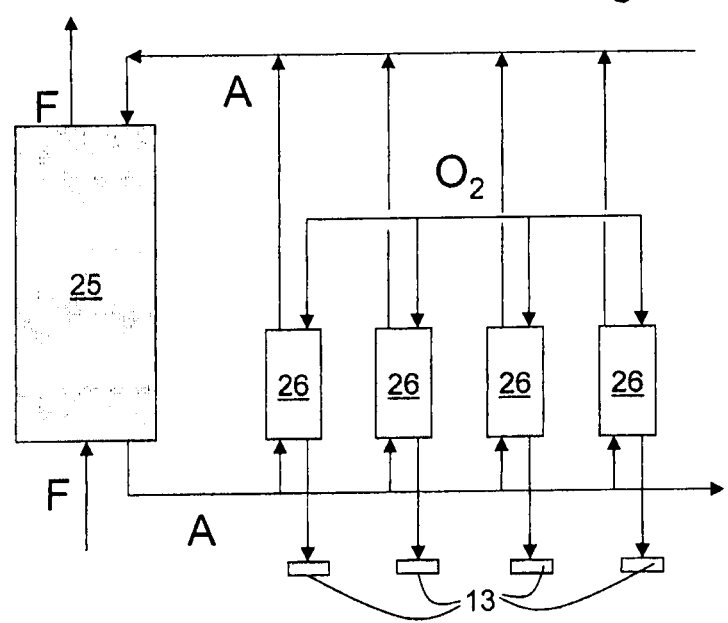
FIG. 4 is a detail of a schematic diagram relating to flow in an embodiment for preheating the oxygen.

FIG. 4 illustrates this principle. The recuperator 25 receives the flue gas F and, countercurrently thereto, the fluid A, for example air. The heated air is sent to a series of heat exchangers 26 in which it flows countercurrently with the oxygen, which is heated before being sent to the burners 13.

In practice, owing to the difficulty of sending hot oxygen over long lines, because of the cost of the lines or because of thermal losses, according to the invention it is advantageously proposed to preheat the oxygen close to the burners in which this oxygen will be consumed. For this reason, it is necessary to increase the number of heat exchangers, each of which will, depending on the situation, feed one burner or a small number of burners located in the immediate vicinity thereof.

In FIG. 4, each burner 13 is fed by a heat exchanger 26.

The air, after preheating the oxygen, is returned to the recuperator 25 or returned to the flue gas duct of the furnace, to be sent into a boiler.

The invention claimed is:

1. A process for melting glass in a glass melting furnace, the furnace comprising a channel-shaped melting tank, the process comprising:
   introducing batch materials at an upstream end of the channel-shaped melting tank,
   heating the furnace by burners distributed on walls along a length of the channel-shaped melting tank downstream of the batch materials introduction point to produce a melt which flows through the channel-shaped melting tank toward a melt discharge point downstream of the burners, whereby at least 65% of combustion energy is produced by oxy-fuel combustion,
   causing at least 65% of the flue gas in the furnace to counterflow in the opposite direction to the flow of the melt, towards flue gas discharge upstream of the burners,
   discharging the counterflowing flue gas so as to maintain dynamic sealing with respect to a surrounding atmosphere,
   producing the counterflowing flue gas at a volumetric rate such that a volume of an atmosphere above molten glass in the furnace and the volumetric rate of counterflowing flue gas produced cause an average residence time of the counterflowing flue gas inside the furnace of from 10 to 40 seconds,
   recovering a molten glass at the downstream end of the furnace, and
   regulating an amount of the flue gas discharged downstream of the burners according to a nitrogen content detected in the flue gas upstream.

2. The process of claim 1, wherein the average residence time of the flue gas inside the furnace is at least 15 seconds.

3. The process of claim 1, wherein the average residence time of the flue gas inside the furnace is at most 30 seconds.

4. The process of claim 1, wherein the average residence time of the flue gas inside the furnace is 15 to 30 seconds.

5. The process of claim 1, wherein a cross section of the furnace is such that an average flow velocity of the flue gas in a longitudinal direction of the furnace, at any point therein, does not exceed 3 m/s.

6. The process of claim 1, wherein a cross section of the furnace is such that an average flow velocity of the flue gas in a longitudinal direction of the furnace, at any point therein, does not exceed 2 m/s.

7. The process of claim 5, wherein the average residence time of the flue gas inside the furnace is 15 to 30 seconds.

8. The process of claim 7, wherein the average residence time of the flue gas inside the furnace is 15 to 30 seconds.

9. The process of claim 1, wherein a percentage of the flue gas discharged, not coming from the combustion, does not exceed 25%.

10. The process of claim 1, wherein a percentage of the flue gas discharged, not coming from the combustion, does not exceed 20%.

11. The process of claim 1, wherein the flue gas has a nitrogen content that does not exceed 10%.

12. The process of claim 1, wherein the flue gas has a nitrogen content that does not exceed 8%.

13. The process of claim 1, wherein a discharge temperature of the flue gas is less than 1500° C.

14. The process of claim 1, wherein a discharge temperature of the flue gas is less than 1450° C.

15. The process of claim 1, wherein a discharge temperature of the flue gas is less than 1350° C.

16. The process of claim 15, wherein the average residence time of the flue gas inside the furnace is 15 to 30 seconds.

17. The process of claim 15, wherein a cross section of the furnace is such that an average flow velocity of the flue gas in a longitudinal direction of the furnace, at any point therein, does not exceed 2 m/s.

18. The process of claim 15, wherein:
   the average residence time of the flue gas inside the furnace is 15 to 30 seconds, and
   a cross section of the furnace is such that an average flow velocity of the flue gas in a longitudinal direction of the furnace, at any point therein, does not exceed 2 m/s.

19. The process of claim 1, comprising:
   discharging at least 75% of the flue gas in the furnace near openings through which the batch materials are introduced at an upstream end of the channel-shaped melting tank, and
   discharging at most 25% of the flue gas close to a downstream end of the channel-shaped melting tank so as to maintain dynamic sealing with respect to a surrounding atmosphere.

20. The process of claim 1, comprising:
   discharging 100% of the flue gas in the furnace near openings through which the batch materials are introduced at an upstream end of the channel-shaped melting tank, so as to maintain dynamic sealing with respect to a surrounding atmosphere.

* * * * *